US008588130B2

(12) United States Patent
Stewart et al.

(10) Patent No.: US 8,588,130 B2
(45) Date of Patent: Nov. 19, 2013

(54) DISTRIBUTED NETWORK COMMUNICATION SYSTEM TO PROVIDE WIRELESS ACCESS TO A COMPUTING DEVICE AT A REDUCED RATE

(75) Inventors: Brett B. Stewart, Austin, TX (US); James Thompson, Austin, TX (US); Kathleen E. McClelland, Austin, TX (US)

(73) Assignee: Wayport, Inc., Austin, TX (US)

( * ) Notice: Subject to any disclaimer, the term of this patent is extended or adjusted under 35 U.S.C. 154(b) by 735 days.

(21) Appl. No.: 11/403,093

(22) Filed: Apr. 12, 2006

(65) Prior Publication Data

US 2006/0190586 A1    Aug. 24, 2006

Related U.S. Application Data

(63) Continuation of application No. 10/792,179, filed on Mar. 3, 2004, now Pat. No. 7,742,445, which is a continuation of application No. 09/551,291, filed on Apr. 18, 2000, now Pat. No. 6,732,176, which is a continuation-in-part of application No. 09/433,818, filed on Nov. 3, 1999, now Pat. No. 6,571,221.

(51) Int. Cl.
*H04W 4/00* (2009.01)

(52) U.S. Cl.
USPC ............................................. 370/328; 370/338

(58) Field of Classification Search
USPC .......... 370/328, 338, 329, 254; 455/450, 451, 455/452.1, 456.1
See application file for complete search history.

(56) References Cited

U.S. PATENT DOCUMENTS

| | | | |
|---|---|---|---|
| 4,021,780 A | 5/1977 | Narey et al. | |
| 4,255,619 A | 3/1981 | Saito | |

(Continued)

FOREIGN PATENT DOCUMENTS

| | | |
|---|---|---|
| EP | 838933 A1 | 4/1998 |
| EP | 915590 A2 | 5/1999 |

(Continued)

OTHER PUBLICATIONS

ORiNOCO AP-1000, "Getting Started, Lucent Technologies", Lucent Technologies, Oct. 6, 2001, all pages (2 pages).*

(Continued)

*Primary Examiner* — Kwang B Yao
*Assistant Examiner* — Adam Duda
(74) *Attorney, Agent, or Firm* — Toler Law Group, PC

(57) ABSTRACT

A system and method for providing access and/or roaming features on a network system. The network system includes a plurality of wireless and/or wired access points coupled to a network. Access points (APs) for the network may be widely distributed in various facilities, such as airports, mass-transit stations, and various businesses. The network may couple to a wide area network, such as the Internet. In one embodiment, a portable computing device (PCD) of a user may store identification information which uniquely indicates a network provider of a plurality of possible network providers. The identification information may also or instead indicate an access or privilege level of the user. Each of the access points are operable to "listen for" or detect identification information associated with numerous different providers. When the access point receives the identification information from a PCD of a user, the access point may determine the appropriate network provider for the portable computing device using the identification information. Network access may then be provided to the portable computing device through the determined network provider. Thus the network system is useable by subscribers of each of the plurality of possible network providers, thereby enabling subscribers to "roam" on various wireless networks, including networks maintained by other providers. The access information may also include an access level which indicates the user's access or privilege level. Thus, the local network may provide various local resources which are available to users having a first access level, and users with a second access level may not be entitled to view or utilize these network resources on the network, but may be simply provided external Internet access.

20 Claims, 4 Drawing Sheets

(56) References Cited

U.S. PATENT DOCUMENTS

| | | |
|---|---|---|
| 4,445,118 A | 4/1984 | Taylor et al. |
| 4,536,647 A | 8/1985 | Atalla et al. |
| 4,757,267 A | 7/1988 | Riskin |
| 4,841,560 A | 6/1989 | Chan et al. |
| 4,845,504 A | 7/1989 | Roberts et al. |
| 4,922,516 A | 5/1990 | Butler et al. |
| 4,973,952 A | 11/1990 | Malec et al. |
| 4,974,170 A | 11/1990 | Bouve et al. |
| 4,977,399 A | 12/1990 | Price et al. |
| 5,089,814 A | 2/1992 | DeLuca et al. |
| 5,095,532 A | 3/1992 | Mardus |
| 5,121,126 A | 6/1992 | Clagett |
| 5,122,795 A | 6/1992 | Cubley et al. |
| 5,131,020 A | 7/1992 | Liebesny et al. |
| 5,185,857 A | 2/1993 | Rozmanith et al. |
| 5,214,793 A | 5/1993 | Conway et al. |
| 5,223,844 A | 6/1993 | Mansell et al. |
| 5,243,652 A | 9/1993 | Teare et al. |
| 5,245,608 A | 9/1993 | Deaton et al. |
| 5,264,822 A | 11/1993 | Vogelman et al. |
| 5,265,070 A | 11/1993 | Minowa |
| 5,303,393 A | 4/1994 | Noreen et al. |
| 5,321,242 A | 6/1994 | Heath, Jr. |
| 5,347,632 A | 9/1994 | Filepp et al. |
| 5,363,377 A | 11/1994 | Sharpe |
| 5,365,516 A | 11/1994 | Jandrell |
| 5,371,794 A | 12/1994 | Diffie et al. |
| 5,390,237 A | 2/1995 | Hoffman et al. |
| 5,404,505 A | 4/1995 | Levinson |
| 5,432,841 A | 7/1995 | Rimer |
| 5,444,444 A | 8/1995 | Ross |
| 5,451,757 A | 9/1995 | Heath, Jr. |
| 5,455,807 A | 10/1995 | Nepple |
| 5,461,627 A | 10/1995 | Rypinski |
| 5,487,103 A | 1/1996 | Richardson |
| 5,493,309 A | 2/1996 | Bjornholt |
| 5,497,414 A | 3/1996 | Bartholomew |
| 5,504,482 A | 4/1996 | Schreder |
| 5,511,111 A | 4/1996 | Serbetcioglu et al. |
| 5,511,233 A | 4/1996 | Otten |
| 5,512,908 A | 4/1996 | Herrick |
| 5,513,263 A | 4/1996 | White et al. |
| 5,528,248 A | 6/1996 | Steiner et al. |
| 5,539,395 A | 7/1996 | Buss et al. |
| 5,544,354 A | 8/1996 | May et al. |
| 5,559,520 A | 9/1996 | Barzegar et al. |
| 5,561,704 A | 10/1996 | Salimando |
| 5,566,235 A | 10/1996 | Hetz |
| 5,572,528 A * | 11/1996 | Shuen .................. 370/402 |
| 5,583,864 A | 12/1996 | Lightfoot et al. |
| 5,586,254 A | 12/1996 | Kondo et al. |
| 5,588,042 A | 12/1996 | Comer |
| 5,590,196 A | 12/1996 | Moreau |
| 5,590,398 A | 12/1996 | Matthews |
| 5,592,470 A | 1/1997 | Rudrapatna et al. |
| 5,594,779 A | 1/1997 | Goodman |
| 5,596,625 A | 1/1997 | LeBlanc |
| 5,602,843 A | 2/1997 | Gray |
| 5,608,854 A | 3/1997 | Labedz et al. |
| 5,610,973 A | 3/1997 | Comer |
| 5,625,364 A | 4/1997 | Herrick et al. |
| 5,625,668 A | 4/1997 | Loomis |
| 5,627,549 A | 5/1997 | Park |
| 5,636,245 A | 6/1997 | Ernst et al. |
| 5,646,632 A | 7/1997 | Khan et al. |
| 5,654,959 A | 8/1997 | Baker et al. |
| 5,657,375 A | 8/1997 | Connolly et al. |
| 5,661,492 A | 8/1997 | Shoap et al. |
| 5,663,734 A | 9/1997 | Krasner |
| 5,664,948 A | 9/1997 | Dimitriadis et al. |
| 5,666,481 A | 9/1997 | Lewis |
| 5,677,905 A | 10/1997 | Bigham |
| 5,687,212 A | 11/1997 | Kinser, Jr. et al. |
| 5,689,431 A | 11/1997 | Rudow et al. |
| 5,694,453 A | 12/1997 | Fuller et al. |
| 5,701,301 A | 12/1997 | Weisser, Jr. |
| 5,704,049 A | 12/1997 | Briechle |
| 5,712,899 A | 1/1998 | Pace, II |
| 5,713,075 A | 1/1998 | Threadgill et al. |
| 5,714,948 A | 2/1998 | Farmakis et al. |
| 5,717,688 A | 2/1998 | Belanger et al. |
| 5,720,033 A | 2/1998 | Deo |
| 5,724,521 A | 3/1998 | Dedrick |
| 5,727,057 A | 3/1998 | Emery et al. |
| 5,729,680 A | 3/1998 | Belanger et al. |
| 5,771,283 A | 6/1998 | Chang et al. |
| 5,774,534 A | 6/1998 | Mayer |
| 5,778,304 A | 7/1998 | Grube et al. |
| 5,790,974 A | 8/1998 | Tognazzini |
| 5,794,210 A | 8/1998 | Goldhaber et al. |
| 5,796,727 A | 8/1998 | Harrison et al. |
| 5,798,733 A | 8/1998 | Ethridge |
| 5,806,018 A | 9/1998 | Smith et al. |
| 5,812,763 A | 9/1998 | Teng |
| 5,819,155 A | 10/1998 | Worthey et al. |
| 5,826,195 A | 10/1998 | Westerlage et al. |
| 5,835,061 A | 11/1998 | Stewart |
| 5,838,774 A | 11/1998 | Weisser, Jr. |
| 5,842,010 A | 11/1998 | Jain et al. |
| 5,845,211 A | 12/1998 | Roach |
| 5,852,775 A | 12/1998 | Hidary |
| 5,855,007 A | 12/1998 | Jovicic et al. |
| 5,870,555 A | 2/1999 | Pruett et al. |
| 5,870,724 A | 2/1999 | Lawlor et al. |
| 5,875,186 A | 2/1999 | Belanger et al. |
| 5,875,401 A | 2/1999 | Rochkind |
| 5,878,126 A | 3/1999 | Velamuri et al. |
| 5,880,958 A | 3/1999 | Helms et al. |
| 5,881,131 A | 3/1999 | Farris et al. |
| 5,884,284 A | 3/1999 | Peters et al. |
| 5,887,259 A | 3/1999 | Zicker et al. |
| 5,889,953 A | 3/1999 | Thebaut et al. |
| 5,892,454 A | 4/1999 | Schipper et al. |
| 5,896,440 A | 4/1999 | Reed et al. |
| 5,897,640 A | 4/1999 | Veghte et al. |
| 5,903,636 A | 5/1999 | Malik |
| 5,907,544 A | 5/1999 | Rypinski |
| 5,920,846 A | 7/1999 | Storch et al. |
| 5,922,040 A | 7/1999 | Prabhakaran |
| 5,923,702 A | 7/1999 | Brenner et al. |
| 5,933,420 A | 8/1999 | Jaszewski et al. |
| 5,938,721 A | 8/1999 | Dussell et al. |
| 5,949,867 A | 9/1999 | Sonnenberg |
| 5,950,130 A | 9/1999 | Coursey |
| 5,961,593 A | 10/1999 | Gabber et al. |
| 5,963,866 A | 10/1999 | Palamara et al. |
| 5,963,913 A | 10/1999 | Tenneuse et al. |
| 5,968,176 A | 10/1999 | Nessett et al. |
| 5,969,678 A | 10/1999 | Stewart |
| 5,982,867 A | 11/1999 | Urban et al. |
| 5,983,091 A | 11/1999 | Rodriguez |
| 5,987,381 A | 11/1999 | Oshizawa |
| 5,991,287 A | 11/1999 | Diepstraten et al. |
| 5,995,015 A | 11/1999 | DeTemple et al. |
| 6,006,090 A | 12/1999 | Coleman et al. |
| 6,009,398 A | 12/1999 | Mueller et al. |
| 6,011,975 A | 1/2000 | Emery et al. |
| 6,018,293 A | 1/2000 | Smith et al. |
| 6,026,151 A | 2/2000 | Bauer et al. |
| 6,028,921 A | 2/2000 | Malik et al. |
| 6,047,327 A | 4/2000 | Tso et al. |
| 6,055,637 A | 4/2000 | Hudson et al. |
| 6,058,106 A | 5/2000 | Cudak et al. |
| 6,067,082 A | 5/2000 | Enmei |
| 6,067,297 A | 5/2000 | Beach |
| 6,076,080 A | 6/2000 | Morscheck et al. |
| 6,085,086 A | 7/2000 | La Porta et al. |
| 6,091,956 A | 7/2000 | Hollenberg |
| 6,101,381 A | 8/2000 | Tajima et al. |
| 6,101,443 A | 8/2000 | Kato et al. |
| 6,112,186 A | 8/2000 | Bergh et al. |
| 6,115,669 A | 9/2000 | Watanabe et al. |
| 6,122,520 A | 9/2000 | Want et al. |
| 6,133,853 A | 10/2000 | Obradovich et al. |

(56) References Cited

U.S. PATENT DOCUMENTS

| | | | |
|---|---|---|---|
| 6,138,003 A | 10/2000 | Kingdon et al. | |
| 6,138,119 A | 10/2000 | Hall et al. | |
| 6,141,609 A | 10/2000 | Herdeg et al. | |
| 6,144,645 A | 11/2000 | Struhsaker et al. | |
| 6,154,152 A | 11/2000 | Ito | |
| 6,154,637 A | 11/2000 | Wright et al. | |
| 6,157,814 A * | 12/2000 | Hymel et al. | 340/7.56 |
| 6,157,829 A | 12/2000 | Grube et al. | |
| 6,157,946 A | 12/2000 | Itakura et al. | |
| 6,163,274 A | 12/2000 | Lindgren | |
| 6,167,255 A | 12/2000 | Kennedy, III et al. | |
| 6,182,226 B1 | 1/2001 | Reid et al. | |
| 6,184,829 B1 | 2/2001 | Stilp | |
| 6,185,426 B1 | 2/2001 | Alperovich et al. | |
| 6,185,484 B1 | 2/2001 | Rhinehart | |
| 6,192,314 B1 | 2/2001 | Khavakh et al. | |
| 6,202,054 B1 | 3/2001 | Lawlor et al. | |
| 6,205,478 B1 | 3/2001 | Sugano et al. | |
| 6,208,854 B1 | 3/2001 | Roberts et al. | |
| 6,208,866 B1 | 3/2001 | Rouhollahzadeh et al. | |
| 6,226,277 B1 | 5/2001 | Chuah | |
| 6,229,477 B1 | 5/2001 | Chang et al. | |
| 6,229,810 B1 | 5/2001 | Gerszberg et al. | |
| 6,233,329 B1 | 5/2001 | Urban et al. | |
| 6,233,452 B1 | 5/2001 | Nishino | |
| 6,236,360 B1 | 5/2001 | Rudow et al. | |
| 6,236,940 B1 | 5/2001 | Rudow et al. | |
| 6,246,361 B1 | 6/2001 | Weill et al. | |
| 6,259,405 B1 | 7/2001 | Stewart et al. | |
| 6,263,209 B1 | 7/2001 | Reed et al. | |
| 6,278,938 B1 | 8/2001 | Alumbaugh | |
| 6,285,665 B1 | 9/2001 | Chuah et al. | |
| 6,285,931 B1 | 9/2001 | Hattori et al. | |
| 6,298,234 B1 * | 10/2001 | Brunner | 455/432.1 |
| 6,308,273 B1 | 10/2001 | Goertzel et al. | |
| 6,311,069 B1 | 10/2001 | Havinis et al. | |
| 6,317,718 B1 | 11/2001 | Fano | |
| 6,321,092 B1 | 11/2001 | Fitch et al. | |
| 6,324,396 B1 | 11/2001 | Vasa et al. | |
| 6,326,918 B1 | 12/2001 | Stewart | |
| 6,327,254 B1 | 12/2001 | Chuah | |
| 6,327,357 B1 | 12/2001 | Meek et al. | |
| 6,332,127 B1 | 12/2001 | Bandera et al. | |
| 6,332,163 B1 | 12/2001 | Bowman-Amuah | |
| 6,337,810 B1 | 1/2002 | Yamasaki et al. | |
| 6,340,958 B1 | 1/2002 | Cantu et al. | |
| 6,343,290 B1 | 1/2002 | Cossins et al. | |
| 6,353,664 B1 | 3/2002 | Cannon et al. | |
| 6,359,880 B1 | 3/2002 | Curry et al. | |
| 6,363,421 B2 | 3/2002 | Barker et al. | |
| 6,366,561 B1 | 4/2002 | Bender | |
| 6,377,548 B1 | 4/2002 | Chuah et al. | |
| 6,377,810 B1 | 4/2002 | Geiger et al. | |
| 6,377,982 B1 | 4/2002 | Rai et al. | |
| 6,385,531 B2 | 5/2002 | Bates et al. | |
| 6,385,591 B1 | 5/2002 | Mankoff | |
| 6,389,426 B1 | 5/2002 | Turnbull et al. | |
| 6,393,482 B1 | 5/2002 | Rai et al. | |
| 6,400,722 B1 | 6/2002 | Chuah et al. | |
| 6,407,673 B1 | 6/2002 | Lane | |
| 6,408,307 B1 | 6/2002 | Semple et al. | |
| 6,414,635 B1 | 7/2002 | Stewart et al. | |
| 6,414,950 B1 | 7/2002 | Rai et al. | |
| 6,415,019 B1 | 7/2002 | Savaglio et al. | |
| 6,418,308 B1 | 7/2002 | Heinonen et al. | |
| 6,421,441 B1 | 7/2002 | Dzuban | |
| 6,421,714 B1 | 7/2002 | Rai et al. | |
| 6,427,073 B1 | 7/2002 | Kortelsalmi et al. | |
| 6,427,119 B1 | 7/2002 | Stefan et al. | |
| 6,430,276 B1 | 8/2002 | Bouvier et al. | |
| 6,430,562 B1 | 8/2002 | Kardos et al. | |
| 6,442,391 B1 | 8/2002 | Johansson et al. | |
| 6,442,479 B1 | 8/2002 | Barton | |
| 6,442,687 B1 | 8/2002 | Savage | |
| 6,449,272 B1 | 9/2002 | Chuah et al. | |
| 6,449,497 B1 | 9/2002 | Kirbas et al. | |
| 6,452,498 B2 | 9/2002 | Stewart | |
| 6,463,533 B1 | 10/2002 | Calamera et al. | |
| 6,470,378 B1 | 10/2002 | Tracton et al. | |
| 6,470,447 B1 | 10/2002 | Lambert et al. | |
| 6,473,626 B1 | 10/2002 | Nevoux et al. | |
| 6,477,382 B1 | 11/2002 | Mansfield et al. | |
| 6,477,526 B2 | 11/2002 | Hayashi et al. | |
| 6,484,029 B2 | 11/2002 | Hughes et al. | |
| 6,484,092 B2 | 11/2002 | Seibel | |
| 6,484,148 B1 | 11/2002 | Boyd | |
| 6,490,291 B1 | 12/2002 | Lee et al. | |
| 6,496,491 B2 | 12/2002 | Chuah et al. | |
| 6,496,931 B1 | 12/2002 | Rajchel et al. | |
| 6,505,046 B1 | 1/2003 | Baker | |
| 6,505,048 B1 | 1/2003 | Moles et al. | |
| 6,505,049 B1 | 1/2003 | Dorenbosch | |
| 6,505,120 B2 | 1/2003 | Yamashita et al. | |
| 6,505,163 B1 | 1/2003 | Zhang et al. | |
| 6,512,754 B2 | 1/2003 | Feder et al. | |
| 6,516,055 B1 | 2/2003 | Bedeski et al. | |
| 6,516,416 B2 | 2/2003 | Gregg et al. | |
| 6,519,252 B2 | 2/2003 | Sallberg | |
| 6,519,458 B2 | 2/2003 | Oh et al. | |
| 6,522,876 B1 | 2/2003 | Weiland et al. | |
| 6,526,275 B1 | 2/2003 | Calvert | |
| 6,526,349 B2 | 2/2003 | Bullock et al. | |
| 6,532,418 B2 | 3/2003 | Chun et al. | |
| 6,545,596 B1 | 4/2003 | Moon | |
| 6,546,257 B1 | 4/2003 | Stewart | |
| 6,560,442 B1 | 5/2003 | Yost et al. | |
| 6,560,461 B1 | 5/2003 | Fomukong et al. | |
| 6,577,643 B1 | 6/2003 | Rai et al. | |
| 6,577,644 B1 | 6/2003 | Chuah et al. | |
| 6,594,482 B1 | 7/2003 | Findikli et al. | |
| 6,618,474 B1 | 9/2003 | Reese | |
| 6,618,593 B1 | 9/2003 | Drutman et al. | |
| 6,622,016 B1 | 9/2003 | Sladek et al. | |
| 6,628,627 B1 | 9/2003 | Zendle et al. | |
| 6,628,928 B1 | 9/2003 | Crosby et al. | |
| 6,628,938 B1 | 9/2003 | Rachabathuni et al. | |
| 6,633,633 B1 | 10/2003 | Bedingfield | |
| 6,640,184 B1 | 10/2003 | Rabe | |
| 6,647,257 B2 | 11/2003 | Owensby | |
| 6,647,269 B2 | 11/2003 | Hendrey et al. | |
| 6,650,901 B1 | 11/2003 | Schuster et al. | |
| 6,654,610 B1 | 11/2003 | Chen et al. | |
| 6,662,014 B1 | 12/2003 | Walsh | |
| 6,665,536 B1 | 12/2003 | Mahany | |
| 6,665,718 B1 | 12/2003 | Chuah et al. | |
| 6,671,272 B2 | 12/2003 | Vaziri et al. | |
| 6,675,017 B1 | 1/2004 | Zellner et al. | |
| 6,675,208 B1 | 1/2004 | Rai et al. | |
| 6,677,894 B2 | 1/2004 | Sheynblat et al. | |
| 6,697,018 B2 | 2/2004 | Stewart | |
| 6,697,783 B1 | 2/2004 | Brinkman et al. | |
| 6,701,160 B1 | 3/2004 | Pinder et al. | |
| 6,701,251 B2 | 3/2004 | Stefan et al. | |
| 6,704,311 B1 | 3/2004 | Chuah et al. | |
| 6,716,101 B1 | 4/2004 | Meadows et al. | |
| 6,721,406 B1 | 4/2004 | Contractor | |
| 6,725,048 B2 | 4/2004 | Mao et al. | |
| 6,732,080 B1 | 5/2004 | Blants | |
| 6,732,101 B1 | 5/2004 | Cook | |
| 6,732,176 B1 | 5/2004 | Stewart et al. | |
| 6,738,808 B1 | 5/2004 | Zellner et al. | |
| 6,754,504 B1 | 6/2004 | Reed | |
| 6,754,582 B1 | 6/2004 | Smith et al. | |
| 6,759,960 B2 | 7/2004 | Stewart | |
| 6,772,064 B1 | 8/2004 | Smith et al. | |
| 6,799,049 B1 | 9/2004 | Zellner et al. | |
| 6,801,509 B1 | 10/2004 | Rai et al. | |
| 6,816,720 B2 | 11/2004 | Hussain et al. | |
| 6,819,929 B2 | 11/2004 | Antonucci et al. | |
| 6,820,062 B1 | 11/2004 | Gupta et al. | |
| 6,829,475 B1 | 12/2004 | Lee et al. | |
| 6,850,758 B1 | 2/2005 | Paul et al. | |
| 6,867,733 B2 | 3/2005 | Sandhu et al. | |
| 6,868,074 B1 | 3/2005 | Hanson | |

(56) References Cited

U.S. PATENT DOCUMENTS

| | | | |
|---|---|---|---|
| 6,874,011 B1 | 3/2005 | Spielman | |
| 6,876,858 B1 | 4/2005 | Duvall et al. | |
| 6,898,569 B1 | 5/2005 | Bansal et al. | |
| 6,937,869 B1 | 8/2005 | Rayburn | |
| 6,937,998 B1 | 8/2005 | Swartz et al. | |
| 6,954,147 B1 | 10/2005 | Cromer et al. | |
| 6,985,747 B2 | 1/2006 | Chithambaram | |
| 6,999,572 B1 | 2/2006 | Shaffer et al. | |
| 7,005,985 B1 | 2/2006 | Steeves | |
| 7,009,556 B2 | 3/2006 | Stewart et al. | |
| 7,023,995 B2 | 4/2006 | Olsson | |
| 7,043,231 B2 | 5/2006 | Bhatia et al. | |
| 7,058,594 B2 | 6/2006 | Stewart et al. | |
| 7,069,319 B2 | 6/2006 | Zellner et al. | |
| 7,085,555 B2 | 8/2006 | Zellner et al. | |
| 7,103,368 B2 | 9/2006 | Teshima | |
| 7,103,476 B2 | 9/2006 | Smith et al. | |
| 7,106,843 B1 | 9/2006 | Gainsboro et al. | |
| 7,110,749 B2 | 9/2006 | Zellner et al. | |
| 7,116,977 B1 | 10/2006 | Moton et al. | |
| 7,124,101 B1 | 10/2006 | Mikurak | |
| 7,130,631 B2 | 10/2006 | Okazaki et al. | |
| 7,139,722 B2 | 11/2006 | Perrella et al. | |
| 7,155,199 B2 | 12/2006 | Zalewski et al. | |
| 7,181,225 B1 | 2/2007 | Moton et al. | |
| 7,181,529 B2 | 2/2007 | Bhatia et al. | |
| 7,188,027 B2 | 3/2007 | Smith et al. | |
| 7,190,960 B2 | 3/2007 | Wilson et al. | |
| 7,203,502 B2 | 4/2007 | Wilson et al. | |
| 7,212,829 B1 | 5/2007 | Lau et al. | |
| 7,224,978 B2 | 5/2007 | Zellner et al. | |
| 7,236,799 B2 | 6/2007 | Wilson et al. | |
| RE39,717 E | 7/2007 | Yates et al. | |
| 7,245,925 B2 | 7/2007 | Zellner | |
| 7,260,378 B2 | 8/2007 | Holland et al. | |
| 7,272,493 B1 | 9/2007 | Hamrick et al. | |
| 7,292,939 B2 | 11/2007 | Smith et al. | |
| 7,295,924 B2 | 11/2007 | Smith et al. | |
| 7,362,851 B2 | 4/2008 | Contractor | |
| 7,383,052 B2 | 6/2008 | Moton et al. | |
| 2001/0001239 A1 | 5/2001 | Stewart | |
| 2001/0007450 A1 | 7/2001 | Begum | |
| 2001/0021646 A1 | 9/2001 | Antonucci et al. | |
| 2001/0028301 A1 | 10/2001 | Geiger et al. | |
| 2001/0034709 A1 | 10/2001 | Stoifo et al. | |
| 2001/0041053 A1* | 11/2001 | Abecassis | 386/83 |
| 2001/0049275 A1 | 12/2001 | Pierry et al. | |
| 2001/0051911 A1* | 12/2001 | Marks et al. | 705/37 |
| 2002/0035474 A1 | 3/2002 | Alpemir | |
| 2002/0037709 A1 | 3/2002 | Bhatia et al. | |
| 2002/0037722 A1 | 3/2002 | Hussain et al. | |
| 2002/0037731 A1 | 3/2002 | Mao et al. | |
| 2002/0037744 A1 | 3/2002 | Bhatia et al. | |
| 2002/0037750 A1 | 3/2002 | Hussain et al. | |
| 2002/0038362 A1 | 3/2002 | Bhatia et al. | |
| 2002/0038384 A1 | 3/2002 | Khan et al. | |
| 2002/0038386 A1 | 3/2002 | Bhatia et al. | |
| 2002/0046090 A1 | 4/2002 | Stewart | |
| 2002/0052781 A1 | 5/2002 | Aufricht et al. | |
| 2002/0077083 A1 | 6/2002 | Zellner et al. | |
| 2002/0077084 A1 | 6/2002 | Zellner et al. | |
| 2002/0077118 A1 | 6/2002 | Zellner et al. | |
| 2002/0077130 A1 | 6/2002 | Owensby | |
| 2002/0077897 A1 | 6/2002 | Zellner et al. | |
| 2002/0087335 A1* | 7/2002 | Meyers et al. | 705/1 |
| 2002/0090932 A1 | 7/2002 | Bhatia et al. | |
| 2002/0095312 A1 | 7/2002 | Wheat | |
| 2002/0102993 A1 | 8/2002 | Hendrey et al. | |
| 2002/0107027 A1 | 8/2002 | O'Neil | |
| 2002/0120713 A1 | 8/2002 | Gupta et al. | |
| 2002/0161637 A1* | 10/2002 | Sugaya | 705/14 |
| 2002/0174147 A1 | 11/2002 | Wang et al. | |
| 2003/0003990 A1 | 1/2003 | Von Kohorn | |
| 2003/0016233 A1 | 1/2003 | Charpentier | |
| 2003/0018527 A1 | 1/2003 | Filepp et al. | |
| 2003/0140088 A1 | 7/2003 | Robinson et al. | |
| 2003/0169151 A1 | 9/2003 | Ebling et al. | |
| 2004/0002329 A1 | 1/2004 | Bhatia et al. | |
| 2004/0097243 A1 | 5/2004 | Zellner et al. | |
| 2004/0111269 A1 | 6/2004 | Koch | |
| 2004/0164898 A1 | 8/2004 | Stewart | |
| 2004/0186902 A1 | 9/2004 | Stewart | |
| 2004/0203903 A1 | 10/2004 | Wilson et al. | |
| 2004/0205198 A1 | 10/2004 | Zellner et al. | |
| 2004/0266453 A1 | 12/2004 | Maanoja et al. | |
| 2005/0017068 A1 | 1/2005 | Zalewski | |
| 2005/0043036 A1 | 2/2005 | Ioppe et al. | |
| 2005/0060365 A1 | 3/2005 | Robinson et al. | |
| 2005/0096067 A1 | 5/2005 | Martin | |
| 2005/0114777 A1 | 5/2005 | Szeto | |
| 2005/0151655 A1 | 7/2005 | Hamrick et al. | |
| 2005/0246097 A1 | 11/2005 | Hamrick et al. | |
| 2005/0272445 A1 | 12/2005 | Zellner | |
| 2006/0030335 A1 | 2/2006 | Zellner et al. | |
| 2006/0030339 A1 | 2/2006 | Zhovnirovsky et al. | |
| 2006/0059043 A1 | 3/2006 | Chan et al. | |
| 2006/0089134 A1 | 4/2006 | Moton et al. | |
| 2006/0094447 A1 | 5/2006 | Zellner | |
| 2006/0099966 A1 | 5/2006 | Moton et al. | |
| 2006/0105784 A1 | 5/2006 | Zellner et al. | |
| 2006/0106537 A1 | 5/2006 | Hamrick et al. | |
| 2006/0164302 A1 | 7/2006 | Stewart et al. | |
| 2006/0167986 A1 | 7/2006 | Trzyna et al. | |
| 2006/0183467 A1 | 8/2006 | Stewart et al. | |
| 2006/0189327 A1 | 8/2006 | Zellner et al. | |
| 2006/0189332 A1 | 8/2006 | Benco et al. | |
| 2006/0195570 A1 | 8/2006 | Zellner et al. | |
| 2006/0253252 A1 | 11/2006 | Hamrick et al. | |
| 2007/0010260 A1 | 1/2007 | Zellner et al. | |
| 2007/0042789 A1 | 2/2007 | Moton et al. | |
| 2007/0105565 A1 | 5/2007 | Enzmann et al. | |
| 2007/0124721 A1 | 5/2007 | Cowing et al. | |
| 2007/0136603 A1 | 6/2007 | Kuecuekyan | |
| 2007/0250920 A1 | 10/2007 | Lindsay | |
| 2008/0096529 A1 | 4/2008 | Zellner | |

FOREIGN PATENT DOCUMENTS

| | | |
|---|---|---|
| EP | 917320 A2 | 5/1999 |
| EP | 924914 A2 | 4/2003 |
| EP | 779752 A2 | 6/2004 |
| WO | WO 99/16263 | 4/1999 |
| WO | WO 99/51005 | 10/1999 |
| WO | WO 00/76249 | 12/2000 |

OTHER PUBLICATIONS

U.S. Appl. No. 11/391,631, "Providing Advertisements to a Computing Device Based on a Predetermined Criterion of a Wireless Access Point," Final Office Action dated May 24, 2010.

U.S. Appl. No. 10/776,293, "Providing Information to a Computing Device Based on Known Location and User Information," Final Office Action dated Aug. 4, 2010.

U.S. Appl. No. 10/776,293, "Providing Information to a Computing Device Based on Known Location and User Information," Non-Final Office Action dated Mar. 29, 2011.

U.S. Appl. No. 11/926,258, "Method and Apparatus for Geographic-Based Communications Service," Non-Final Office Action dated Aug. 11, 2010.

U.S. Appl. No. 11/926,258, "Method and Apparatus for Geographic-Based Communications Service," Final Office Action dated Jan. 24, 2011.

U.S. Appl. No. 11/926,258, "Method and Apparatus for Geographic-Based Communications Service," Non-Final Office Action dated May 25, 2011.

U.S. Appl. No. 11/931,770, "Receiving Location Based Advertisements on a Wireless Communication Device," Non-Final Office Action dated Aug. 18, 2010.

U.S. Appl. No. 11/931,770, "Receiving Location Based Advertisements on a Wireless Communication Device," Final Office Action dated Jan. 21, 2011.

(56) References Cited

OTHER PUBLICATIONS

U.S. Appl. No. 11/924,284, "Method and Apparatus for Geographic-Based Communications Service," Final Office Action dated Dec. 22, 2010.
U.S. Appl. No. 11/924,215, "Method and Apparatus for Geographic-Based Communications Service," Final Office Action dated Apr. 14, 2011.
U.S. Appl. No. 11/402,132, "Dynamically Modifying the Display of a Computing Device to Provide Advertisements," Notice of Allowance dated Jul. 20, 2010.
U.S. Appl. No. 11/924,284, "Method and Apparatus for Geographic-Based Communications Service," Non-Final Office Action dated Jun. 16, 2010.
U.S. Appl. No. 11/924,215, "Method and Apparatus for Geographic-Based Communications Service," Non-Final Office Action dated Aug. 25, 2011.
Andy Harter and Andy Hooper, A Distributed Location system for the Active Office, IEEE Network, Jan./Feb. 1994.
Max J. Egenhofer, Spatial SQL: A Query and Presentation Language, IEEE Network, Feb. 1994.
Mike Spreitzer and Marvin Theimer, Providing Location Information in a Ubiquitous Computing Environment, Proceedings of the Fourteenth ACM Symposium on Operating Systems Principles, Dec. 1993.
George W. Fitzmaurice, Situated Information Spaces and Spatially Aware Palmtop Computers, Communication of the ACM, Jul. 1993.
Ronald Azuma, Tracking Requirements for Augmented Reality, Communications of the ACM, vol. 36 No. 1, Jan. 1992.
Roy Want, et al., The Active Badge Location System, ACM Transactions on Information Systems, vol. 10, No. 1, Jan. 1992.
Marvin White, Emerging Requirements for Digital Maps for In-Vehicle Pathfinding and Other Traveller Assistance, Vehicular Navigation and Information Systems Conference Proceedings, Part 1, Oct. 1991.
Fred Phail, The Power of a Personal Computer for Car Information and Communications Systems, Vehicular Navigation and Information Systems Conference Proceedings, Part 1, Oct. 1991.
Thomas A. Dingus, et al., Human Factors Engineering the TravTek Driver Interface, Vehicular Navigation and Information Systems Conference Proceedings, Part II, Oct. 1991.
Michael Muffat et al., European Cooperation on Dual Mode Route Guidance Perspectives for Advanced Research Partners, Vehicular Navigation and Information Systems Conference Proceedings, Part II, Oct. 1991.
Bhagwat et al., Transparent Resource Discovery for Mobile Computers, Jun. 1995, IEEE, pp. 116-118.
Kuo, W. K. et al., Time Bounded Services and Mobility Management in IEEE 802.11 Wireless LANs, Personal Wireless Communications 1997 IEEE International Conference in Mumbai, India, Dec. 17-19, 1997; New York, New York, U.S.A., Dec. 17, 1997, pp. 157-161.
High-Performance Wireless Access Point for the Enterprise, ORiNOCO™ AP-100 Access Point for the enterprise, Lucent Technologies, 2000.
IEEE Standards for Local and Metropolitan Area Networks: Virtual Bridged Local Area Networks, IEEE Std. 802, IQ-1998, Dec. 8, 1998.
ORiNOCO AP-1000—Getting Started, Lucent Technologies, Oct. 6, 2001.
ORiNOCO Manager Suite User's Guide, Lucent Technologies, Nov. 2000.

* cited by examiner

| Identification information 1 | Network provider 1 | Access method/destination 1 Access level 1 |
| Identification information 2 | Network provider 2 | Access method/destination 2 Access level 2 |
| Identification information 3 | Network provider 3 | Access method/destination 3 Access level 3 |
| Identification information 4 | Network provider 4 | Access method/destination 4 Access level 4 |
| Identification information 5 | Network provider 5 | Access method/destination 5 Access level 5 |

Fig. 5

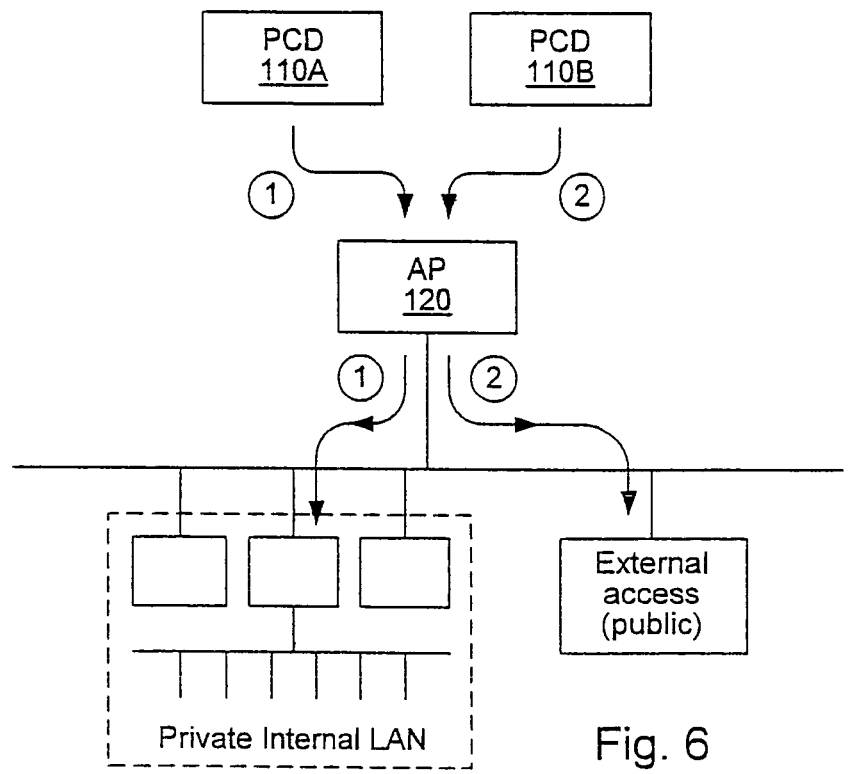

Fig. 6

DISTRIBUTED NETWORK COMMUNICATION SYSTEM TO PROVIDE WIRELESS ACCESS TO A COMPUTING DEVICE AT A REDUCED RATE

CROSS REFERENCE TO RELATED APPLICATIONS

This application is a continuation of application Ser. No. 10/792,179 filed on Mar. 3, 2004 now U.S. Pat. No. 7,742,445 titled, "A Distributed Network Communication System Which Enables Multiple Network Providers to Use a Common Distributed Network Infrastructure," which is a continuation of application Ser. No. 09/551,291 filed on Apr. 18, 2000 titled, "A Distributed Network Communication System Which Enables Multiple Network Providers to Use a Common Distributed Network Infrastructure," now U.S. Pat. No. 6,732,176, which is a continuation-in-part of application Ser. No. 09/433,818 filed on Nov. 3, 1999 titled, "A Network Communications Service With an Improved Subscriber Model Using Digital Certificates," now U.S. Pat. No. 6,571,221.

CONTINUATION DATA

This application is a continuation of application Ser. No. 09/551,291 titled "Distributed Network Communication System Which Enables Multiple Network Providers to Use a Common Distributed Network Infrastructure," filed on Apr. 18, 2000, whose inventors are Brett B. Stewart, James W. Thompson, and Kathleen E. McClelland, which was a continuation-in-part of application Ser. No. 09/433,818 titled "A Network Communications Service with an Improved Subscriber Model Using Digital Certificates," filed on Nov. 3, 1999, whose inventors are Brett B. Stewart and James Thompson, now U.S. Pat. No. 6,571,221.

BACKGROUND OF THE INVENTION

1. Field of the Invention

This invention relates generally to network communications, and more specifically to a system and method enabling a network infrastructure to support multiple network providers and/or customers of multiple network providers. The invention also relates to a system and method enabling different access levels within a wired or wireless network system.

2. Description of the Relevant Art

Various types of wired and wireless infrastructures are being developed to service users of computing devices, such as portable computing devices (PCDs). Currently, numerous providers are attempting to install wireless network infrastructures in various locations, such as airports, hotels, office buildings, etc. for use by various users. However, when two or more providers install a wireless network infrastructure in a single location, such as an airport, the providers may begin to oversubscribe the RF domain. In other words, the electromagnetic spectrum usable by these wireless networks is limited, and if two or more wireless networks are installed in the same location, this may result in inadequate RF bandwidth for use by each of these networks. Currently, only 3 non-overlapping RF channels are available for different network providers. Once these channels are used, no further bandwidth, or limited bandwidth, may be available for other providers.

IEEE 802.11 defines the IEEE standard for wireless Ethernet. IEEE 802.11 is designed to support multiple overlapping wireless local area networks (LANs) in a given coverage area. Each wireless local area network will typically include one or more access points which communicate in a wireless fashion with a corresponding computing device of a user, which typically includes a wireless Ethernet transceiver. IEEE 802.11 currently uses a System ID (SID) to "select" which LAN to use and which access point with which to associate.

However, due to the problems associated with multiple wireless infrastructures installed in a common area, it may be desirable to provide a single wireless (or wireless and wired) infrastructure which may be used by two or more different network service providers. Therefore, it would be desirable to provide a system and method which enables a common wireless network infrastructure to be used by two or more network service providers. This would allow a plurality of service providers to utilize a common set of access points to provide service to a potentially overlapping set of customers. This would also provide subscribers or users with the ability to more fully utilize the existing network infrastructure. It would further be desirable to provide a distributed wireless network system which can selectively provide different access levels to users of the system. It would further be desirable to provide the above features in a wired network service system.

SUMMARY OF THE INVENTION

One embodiment of the present invention comprises a system and method for providing access and/or roaming features on a distributed network system. The network system includes a plurality of access points coupled to a network. The network access points include wireless access points and may also include wired access points. Access points (APs) for the network may be widely distributed in various facilities, such as airports, mass-transit stations, and various businesses, such as business offices, restaurants, and stores, e.g., coffee shops or restaurants at an airport. The network may couple to a wide area network, such as the Internet. A plurality of network providers may provide network services, such as Internet access, over the network infrastructure.

In one embodiment, a user, also referred to as a subscriber, may access the network system through a portable computing device (PCD) using, for example, a wireless (or wired) network interface card. When in sufficiently close range to an access point, the PCD may wirelessly access the network system, or the PCD may be directly connected to a wired connection. In one embodiment, the APs are arranged at known geographic locations and may provide geographic location information regarding the geographic location of the AP or the mobile user.

Each PCD may store identification information which may uniquely indicate at least one network provider of a plurality of possible network providers. The identification information thus may designate the network provider (or providers) to which the user of the PCD is a subscriber. The identification information may take various forms, such as a System ID (SID), MAC ID, or other identification which may be used to identify the network provider to which the user has subscribed. When the PCD becomes close to an access point, the PCD may provide the identification information to the access point.

In one embodiment, each of the access points are operable to "listen for" or detect identification information, e.g., System IDs, associated with numerous different providers. Alternatively, each of the access points may be operable to broadcast requests for identification information, e.g., broadcast recognized System IDs to the PCDs, wherein the PCDs may respond to this broadcast by providing the identification information. When the access point receives the identification information from a PCD of a user, the access point may determine the network provider for the portable computing device using the identification information. Thus, the network system is able to recognize and process identification information which identifies any of the plurality of possible network providers. In one embodiment, the APs answer all queries from all PCDs, even if the identification information from the PCD does not match the information available to that particular AP, e.g., even if an unknown SID is received.

In one embodiment, the network system may include a memory medium which stores a list of identification information that maps to a corresponding list of the plurality of possible network providers. The memory medium may be comprised in one or more of, or all of, the access points, or may be comprised in one or more other devices connected to the network, such as a computer system. In this embodiment, determining the network provider for the portable computing device includes accessing the memory medium and using the received identification information to determine the network provider. For example, the access point or other device may use the received System ID to index into a table to determine the appropriate network provider.

The memory medium may also store associated access information. For each of the network providers, the access information may include access methods for providing user data to the respective network provider, such as a destination IP address of the network provider. The appropriate access method may be used based on the identification information and/or the determined network provider. Thus, the identification information may be used to determine the appropriate provider as well as be used to automatically route network packets or data from/to that PCD to the appropriate provider.

The access information stored on the memory medium may also include an access level which indicates the user's access rights or privilege level. Thus, the local network may provide various local resources which are available to all users regardless of access level, and users with a higher access level may in addition be entitled to Internet access. In other environments, all users may receive Internet access, and users with a lower access level may not be entitled to view or utilize certain or all local network resources on the network. Thus, depending on the access level, the user may be simply provided solely with external Internet access, or only local network access, or may be provided with no network service. The access level may also possibly depend on the known geographic location of the AP or the user. For example, the access level for each user may vary depending on the known geographic location of the AP to which the user is currently associated.

In one embodiment, one or more of the network provider ID and the access information may be provided by the PCD of the user. Thus, an access point or other device on the network may not be required to perform a look-up to determine this information, but rather this information may be provided by the PCD.

When the portable computing device communicates with the access point, the network access may be provided to the portable computing device through the determined network provider. For example, the access point may provide the data to a destination based on or specified by the determined network provider, e.g., may provide or route the data to the determined network provider's site, e.g., to equipment provided by the network provider. The network provider may then provide Internet access and/or provide other network services. The network provider will also typically charge a fee for this service. The access point preferably provides the data to the destination in a secure manner to prevent the data from being unintentionally provided to third parties, such as other providers.

Thus the network system is useable by subscribers of each of the plurality of possible network providers, thereby enabling subscribers to "roam" on various networks, including networks maintained by other providers. For example, the plurality of access points may be maintained by a first network provider, and a subscriber of a second network provider may be recognized and allowed use of the network. Alternatively, the plurality of access points may be maintained by an independent third party, and subscribers of any of various network providers may be recognized and allowed use of the network. Network providers may charge subscribers for access regardless of who operates or maintains the network. In addition, the network system may selectively provide different access levels to network resources depending on the access or privilege level of the user. This allows visitors or non-members of a network system to be allowed certain network services, such as Internet access, without compromising other private network resources.

BRIEF DESCRIPTION OF THE DRAWINGS

Other objects and advantages of the invention will become apparent upon reading the following detailed description and upon reference to the accompanying drawings in which:

FIG. 5 illustrates an example of a data structure which stores network provider and access information; and FIG. 6 illustrates selectively allowing access to a wireless network system using various access levels.

Figure 1:
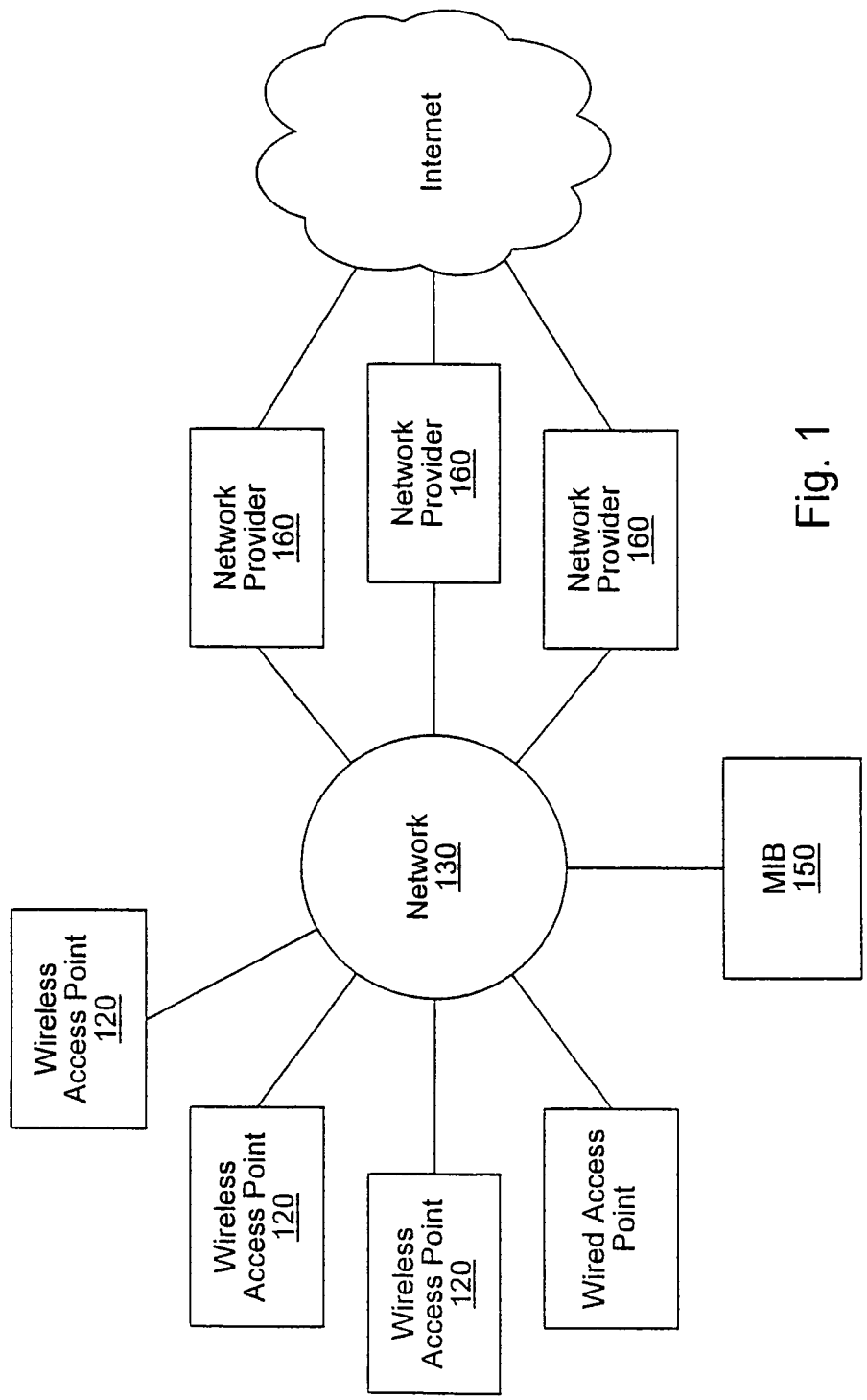
FIG. 1 is a block diagram of one embodiment of a wireless network system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,835,061, titled "Method and Apparatus for Geographic-Based Communications Service", whose inventor is Brett B. Stewart, is hereby incorporated by reference in its entirety as though fully and completely set forth herein.

U.S. Pat. No. 5,969,678, titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

U.S. patent application Ser. No. 09/433,818 titled "A Network Communications Service with an Improved Subscriber Model Using Digital Certificates" and filed on Nov. 3, 1999, whose inventors are Brett B. Stewart and James Thompson, is hereby incorporated by reference in its entirety as though fully and completely set forth herein.

U.S. patent application Ser. No. 09/551,309 titled "System and Method for Managing User Demographic Information Using Digital Certificates" and filed on Apr. 18, 2000, whose inventors are Brett B. Stewart and James Thompson, is hereby incorporated by reference in its entirety as though fully and completely set forth herein.

FIG. 1—Network Communication System

FIG. 1 shows one embodiment of a distributed network communication system 100. The network system 100 may include one or more access points 120, preferably a plurality of access points 120. At least a subset of the access points 120 are wireless plurality of access points 120. At least a subset of the access points 120 are wireless access points (APs) 120 which communicate with a portable computing device (PCD) 110 in a wireless fashion. Each wireless access point (AP) 120 may have a wireless connection or transceiver (e.g., an antenna) and may operate according to various wireless standards, such as wireless Ethernet (IEEE 802.11). One or more of the access points 120 may also be wired access points which communicate with a portable computing device 110 in a wired fashion.

Each AP 120 may be coupled to a network 130. The network 130 may comprise a wired network, a wireless network or a combination of wired and wireless networks. For example, the network 130 may be a standard "wired" Ethernet network which connects each of the wireless (and wired) access points 120 together. The network 130 may also be a wireless network based on IEEE 802.11. The network 130 may form part of the Internet, or may couple to other networks, e.g., other local or wide area networks, such as the Internet.

The network 130 may also include or be coupled to other types of communications networks, (e.g., other than the Internet) such as the public switched telephone network (PSTN), whereby a user using PCD 110 may send and receive information from/to the PSTN or other communication network through a network provider. The network 130 may also include, or be coupled to, another wide area network 130, such as a proprietary WAN. The network 130 thus may be, or be coupled to, any of various wide area networks (WANs) or local area networks (WANs), including the Internet.

The access points (APs) 120 may be widely distributed in various facilities, such as airports, mass-transit stations, shopping malls, restaurants and other businesses, such as business offices, law firm offices, retail stores, etc. For example, where the access points 120 are distributed in an airport, one or more access points 120 may be distributed throughout various terminals in the airport, in an airline club, and in coffee shops, restaurants or rental car counters at the respective airport. The access points 120 may thus be primarily designed to service mobile users, wherein it may not be known ahead of time which mobile users will be accessing the network from which locations. Thus the network system 100 is preferably a distributed network system, with access points placed in locations to service mobile users. This differs from a conventional fixed LAN, where it is generally pre-configured as to which pre-determined users will be using which nodes in the fixed LAN on a day-to-day basis, and the relative access levels that these pre-determined users have is also pre-configured.

Each access point 120 may comprise information used to identify or select a network provider for a particular user, as well as related access information to enable the network provider to provide access. When in sufficiently close range to an access point 120, or when the PCD 110 is directly coupled to an access point 120 in a wired fashion, the PCD 110 may access the network utilizing a particular network provider, as discussed further below.

A user operating a portable computing device (PCD) 110 may communicate with one of the access points 120 to gain access to network services, such as Internet access. The portable computing device (PCD) 110 may have a wireless communication device, e.g., a wireless Ethernet card, for communicating with a wireless access point 120. The portable computing device (PCD) 110 may instead have a wired communication device, e.g., an Ethernet card, for communicating with a wired access point 120.

The portable computing device 110 may be any of various types of devices, including a computer system, such as a portable computer, a personal digital assistant (PDA), an Internet appliance, a communications device, or other wired or wireless device. The PCD may include various wireless or wired communication devices, such as a wireless Ethernet card, paging logic, RF communication logic, a wired Ethernet card, a modem, a DSL device, an ISDN device, an ATM device, a parallel or serial port bus interface, or other type of communication device.

The PCD 110 preferably includes a memory medium which stores identification information indicating a network provider to which the user has subscribed. The indicated network provider may be one of a plurality of possible network providers that provide Internet access or other network services in a network system such as that shown in FIG. 1. The identification information may be a System ID (an 802.11 System ID), a MAC ID of a wireless Ethernet device comprised in the PCD 110, the name of the network provider, or other type of information that uniquely identifies one (or more) network providers. The identification information may be contained in a digital certificate, which may be stored in a web browser or other location of the personal computing device 110.

Where the access point 120 is a wireless access point 120, the wireless communication may be accomplished in a number of ways. In one embodiment, PCD 110 and wireless AP 120 are both equipped with an appropriate transmitter and receiver compatible in power and frequency range (e.g., 2.4 GHz) to establish a wireless communication link. Wireless communication may also be accomplished through cellular, digital, or infrared communication technologies, among others. To provide user identification and/or ensure security, the PCD 110 may use any of various security mechanisms.

Where the access point 120 is a wired access point 120, the wired connection may be accomplished through a variety of different ports, connectors, and transmission mediums. For example, the PCD 110 may be connected through an Ethernet, USB, serial, or parallel transmission cables, among others. The PCD 110 may also include various communication devices for connecting to the AP 120, such as wired Ethernet cards, modems, DSL adapters, ATM adapters, IDSN devices, or other communication devices. For example, a hotel may have Ethernet connections in the restaurants, shops, and guest rooms. An airline club, e.g., an airport Admiral's Club, may also have both wireless and wired connections for mobile users. A user may connect to a wired access point 120 through the use of a laptop computer (PCD 110), an Ethernet network card, and a network cable. This connection may have the same impact as a connection made to a wireless AP 120 as discussed above. In other words, a user using a wired PCD 110 is able to "roam" on various network infrastructures in the same manner as a user using a wireless PCD 110.

One or more network providers may each have an associated network device 160 coupled to the network 130. For example, FIG. 1 illustrates network devices 160 associated with three different network providers. The network devices 160 may take any of various forms, such as a computer system, router, bridge, etc. It is noted that network providers may provide network services at a location without being required to locate any equipment or bandwidth at a network location. For example, a network provider may combine VLANs and IP tunneling to avoid having to locate any equipment or bandwidth at a particular network location.

A user operating a portable computing device 110 will typically have previously subscribed with one (or more) network providers. Examples of network providers include Wayport, MobileStar and Softnet, among others. As discussed further below, when the PCD 110 of a user communicates with an AP 120, the respective network provider to which the user is subscribed is determined. If no previous affiliation with a network provider is detected, a default network provider may be selected. After the network provider is determined or selected, network access or services may be provided through that network provider. For example, data or packets from the respective PCD 110 may be routed to a destination designated by the respective network provider, such as the respective provider's network device 160. This effectively allows a plurality of network providers to each offer access on a common network infrastructure. This also allows subscribers of various network providers to "roam" on other networks, such as networks installed and/or maintained by other providers, or networks maintained by independent third parties.

The network system 100 may also include a management information base (MIB) 150. The MIB 150 may be a mechanism, such as a memory, which may allow the persistent storage and management of information needed by network 130 to operate. For example, in one embodiment of the invention, the MIB 150 may store a data structure, such as a table comprising a list of identification information and a corresponding list of the plurality of possible network providers. The data structure may also store access information, which may comprise associated methods for providing data to the respective plurality of possible network providers. The access information may further comprise access level or privilege level information. Thus, the data structure may comprise a table having a plurality of tuples, with each tuple having the identification information, e.g., a System ID, the corresponding network provider, and access information containing a method of access to the provider, possibly including a destination IP address or other methodology for accessing the provider's site. In an alternate embodiment, as noted above, the data structures which store this information may be comprised in each of the access points 120, or may be provided in various other locations.

As discussed further below, when a portable communication device 110 of a user begins communication with an access point 120, the network provider for the portable computing device 110 may be determined using this data structure. The memory medium containing the data structure may be accessed, and received network provider identification information from the respective portable computing device 110 may be used to index into the data structure or table to determine the network provider. The appropriate access method may also be accessed and used for enabling the network provider to provide network services, e.g., the access method may be used for providing the data from the respective portable computing device 110 to the determined network provider. Access level information may also be retrieved and used to determine a user's access to local network resources or Internet access.

The MIB 150 may store other information, such as a directory of all the elements (e.g., APs, PCDs, etc) in the network, the topology of the network, characteristics of individual network elements, characteristics of connection links, performance and trend statistics, and any information which is of interest in the operation of the network 130. For example, the MIB may store the precise longitude, latitude, altitude and other geographic information pinpointing the location of each access point.

One or more service providers 140 may also be coupled to the network 130 or other networks to which the network 130 is coupled, such as the Internet 170. As used herein, the term "service provider" is intended to include various types of service and information providers which may be connected to the network 130. The service provider 140 may take any of various forms and may provide any of various services or information. Each service provider 140 may include one or more computers or computer systems configured to provide goods, information, and/or services as appropriate for the service provider. The one or more service providers 140 may couple to the network in a wired or wireless fashion.

The network communication system 100 may be geographic-based. In other words, the network communication system 100 may provide information and/or services to the user based at least partly on the known geographic location of the user, e.g., as indicated by the access points 120 or as indicated by geographic information (e.g., GPS information) provided from the PCD 110. In one embodiment, the APs 120 are arranged at known geographic locations and may provide geographic location information regarding the geographic location of the user or the PCD 110. In another embodiment, the PCD 110 may provide geographic location information of the PCD 110 through the AP 120 to the network 130. For example, the PCD 110 may include GPS (Global Positioning System) equipment to enable the PCD 110 to provide its geographic location through the AP 120 to the network 130, such as to a service provider 140 coupled to the network 130.

Memory Medium and Carrier Medium

One or more of the systems described above, such as PCD 110, access points 120, MIB 150, and network providers 160 may include a memory medium on which computer programs or data according to the present invention may be stored. For example, each of the access points 120 and/or the MIB 150 may store a data structure as described above comprising information regarding identification information, corresponding network providers 160 and access information such as associated data routing methods. Each of the access points 120 and/or the MIB 150 may further store a software program for accessing these data structures and using the information therein to properly provide or route data between users (subscribers) and their corresponding network providers, or to selectively provide or route data depending on the access information.

The term "memory medium" is intended to include various types of memory or storage, including an installation medium, e.g., a CD-ROM, or floppy disks 104, a random access memory or computer system memory such as DRAM, SRAM, EDO RAM, Rambus RAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the systems described above may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium in one or more of the above systems thus may store a software program or data for performing or enabling roaming or selective network resource access within a network system 100. A CPU or processing unit in one or more of the above systems executing code and data from a memory medium comprises a means for executing the software program according to the methods or flowcharts described below.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

FIG. 2

Figure 2:
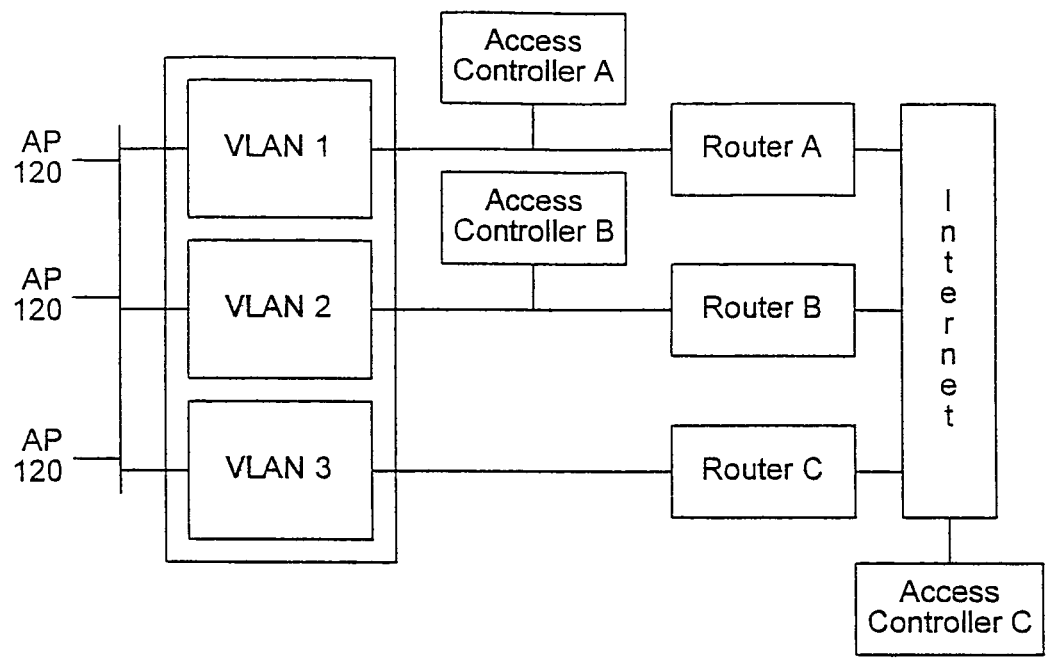
FIG. 2 is a more detailed block diagram of one embodiment of the wireless network system of FIG. 1.

FIG. 2 is a more detailed block diagram illustrating a portion of the wireless network system of FIG. 1. FIG. 2 illustrates an embodiment having three access points 120 which each couple through a respective VLAN, labeled VLAN1, VLAN2 and VLAN3. Each of VLAN1, VLAN2 and VLAN3 in turn couple to respective routers 160, labeled router A, router B and router C, which are provided by the respective network providers A, B and C respectively. These routers in turn couple to the Internet. As shown, one or more access controllers, e.g., computer systems configured to determine or control network service access, may be provided for each of the network providers. The access controllers operate to verify user or subscriber access to the respective provider's network. FIG. 2 illustrates access controller A, access controller B and access controller C. As shown, access controllers A and B are coupled to router A and router B respectively. However, the access controller may be located outside of the local network 130, e.g., may be comprised on any of various locations on the Internet, as shown with respect to access controller C.

In this embodiment, the data structure may store an identification information/VLAN tag mapping, e.g., an SID/VLAN tag mapping, which operates to map the user to the appropriate VLAN of the user's network provider.

Figure 3:
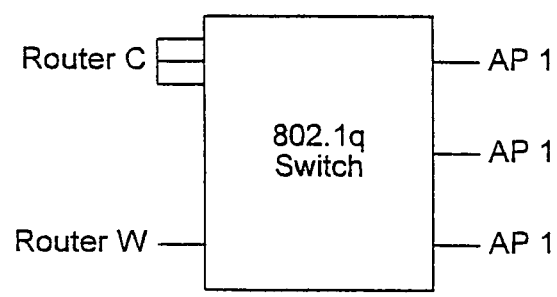
FIG. 3 is a block diagram of another embodiment of the wireless network system of FIG. 1.

As shown, each of VLAN1, VLAN2 and VLAN3 may be supported in one or more Ethernet switches which support tagged VLANs (IEEE 802.1q). In addition, the switch may also support IEEE 802.1p, which provides various quality of service (QoS) metrics. This enables the switches to enforce certain predefined quality of service metrics to any given port or virtual port contained within the network. As shown in FIG. 3, it is also noted that a router may be present on more than one VLAN. As shown, FIG. 3 includes an 802.1q switch which couples to three access points referred to as access point 1 (AP1), access point 2 (AP2), and access point 3 (AP3). As shown, a router labeled router C may be coupled to two or more VLANs as shown.

Using VLANs, each access point 120 preferably has the ability to transmit/receive on one or more VLAN IPs to one or more service providers. This permits, but does not require, that each network provider use its own network numbering plan. At most, each network provider may have an access controller and a router at each coverage location. As shown in FIG. 3, the access controller is not required to be physically located at the coverage location, but rather may be located anywhere.

Figure 4:
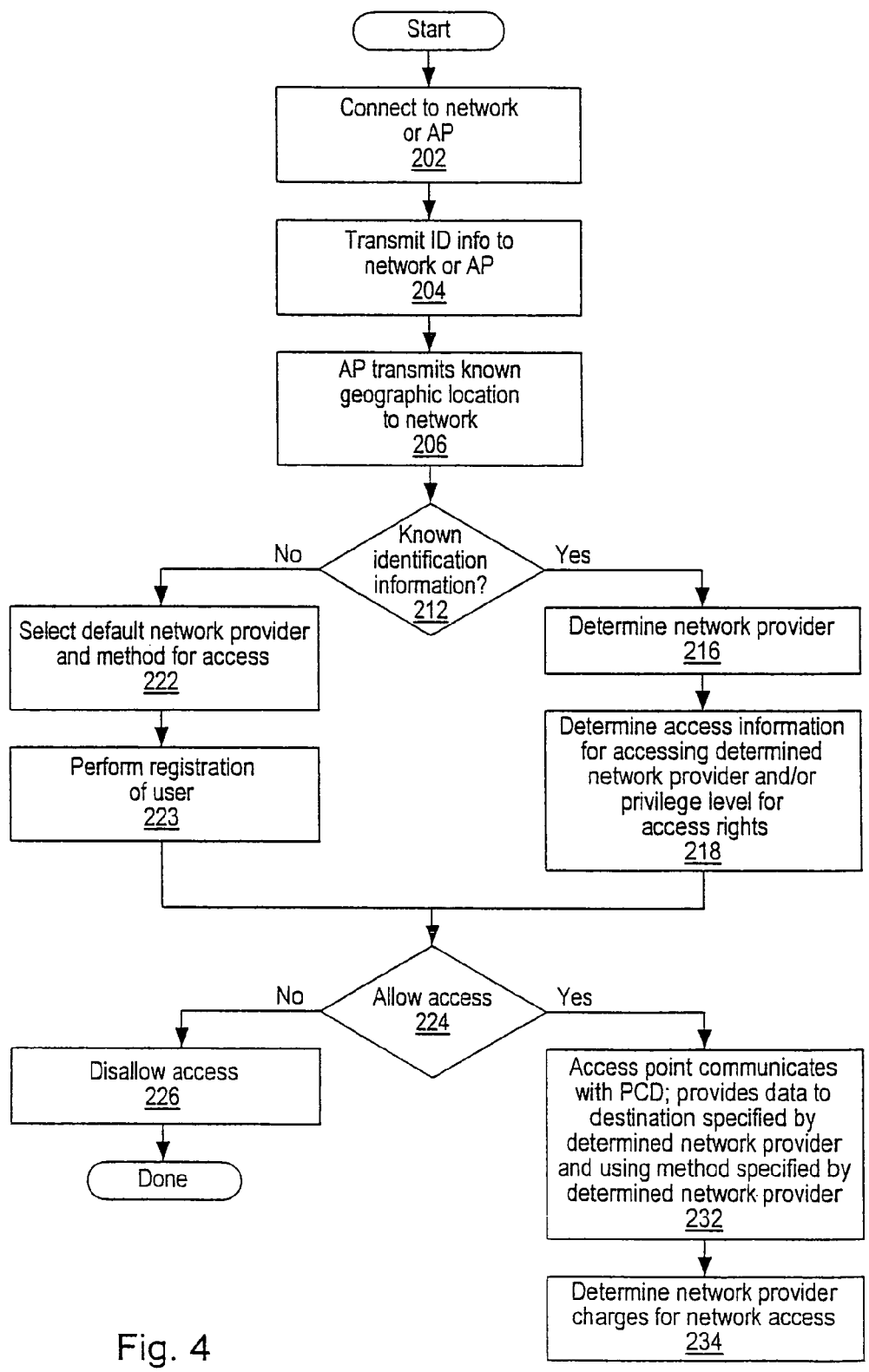
FIG. 4 is a flowchart diagram illustrating operation of allowing access to a wireless network system using a roaming model.

FIG. 4—Network Access using Roaming

FIG. 4 is a flowchart diagram illustrating operation of allowing roaming access and/or selective access to a wireless network system. In one embodiment, as described above, the PCD 110 includes identification information, preferably comprising a System ID, stored in the memory of the PCD 110. The identification information may store information which identifies one (or more) network providers to which the user of PCD 110 is a subscriber.

The network access method of the present invention may be operable to receive and use the identification information to facilitate roaming, e.g., to allow a particular network provider to be selected and used for a user operating on the network. As discussed further below, the identification information may also store access level information which may be used to indicate a network access or privilege level. This stored access level information may be used to selectively allow user access to different parts of the network.

As shown, in step 202 the user connects to the network (e.g., to an access point of the network). For example, the user may be walking in an airport with a portable computing device and may connect in a wireless fashion to an access point located at the airport. In another scenario, the user may enter a hotel room and connect in a wireless fashion to an Ethernet port in his/her room which is connected to the network. In another scenario, the user may enter an office of a business, such as a law firm or corporation, and may connect in a wireless or wired fashion to an access point located in that office. Thus, the user may connect to the network or an access point of the network in any of various locations in a wireless or wired fashion.

In step 204 the personal computing device (PCD) 110 of the user transmits identification information (ID information) to an access point (AP) 120 of the network. The identification information may take any of various forms. In one embodiment, the identification information comprises a System ID (SID) according to IEEE 802.11. As discussed above, IEEE 802.11 (wireless Ethernet) is designed to support multiple overlapping wireless LANs in a given coverage area. IEEE 802.11 uses the System ID (SID) to "select" which LAN to use, and thus which access point with which to associate. In this embodiment each System ID may be uniquely associated with a respective network provider, and thus the user may configure the System ID on his/her PCD 110 to uniquely identify the network provider to which the user has selected or subscribed.

The identification information may also or instead be a MAC (media access controller) ID which is comprised on a wireless Ethernet card of the personal computing device used by the user. The MAC ID may perform a similar purpose in selecting the network provider. As noted above, the identification information may take various forms. For example, the identification information may simply comprise the name of the respective provider and the appropriate access information, which may be contained in a digital certificate. The identification information may comprise other types of network provider identification as desired.

In prior art systems, access points are only able to "listen for" one System ID which corresponds to one network provider. According to one embodiment of the invention, each access point 120 is operable to "listen for" or "detect" a plurality of different sets of identification information, e.g., a plurality of different System IDs, which may correspond to a plurality of different possible network providers, or which may correspond to unknown network providers. Thus, each AP may be set up to "listen" for all types of identification information, e.g., listen for all SIDs, and to answer all queries from PCDs 110, even if the identification information or SID is not recognized by the particular AP 120. Alternatively, each of the access points may be operable to broadcast requests for identification information. For example, each of the access points may periodically broadcast requests for SIDs. Alternatively, each of the access points may periodically broadcast recognized System IDs to the PCDs, i.e., broadcast the sets of SIDs the access point supports, wherein the PCDs may respond to this broadcast by providing the identification information.

In step 206 the access point 120 to which the user has connected may transmit known geographic location information to the network (e.g., to a network provider on the network). This known geographic location information may originate from the AP 120 or from the PCD 110 of the user. As discussed further below, this known geographic location information may be used in various ways. For example, the geographic location information may be used in selecting among two or more possible network providers to which the user has previously subscribed, or may be used in selecting the default provider.

The geographic location information may also be used in determining the network services or access privileges of the user, or used in determining charging aspects of the use. For example, this known geographic location information may be used to determine whether a third party pays for the network access of the user. As one example, an employer of the user (employee) may have previously directed that the employer will pay for network access of the employee if the employee is located in an airport or hotel, but not if the employee is located, for example, in a bar. The known geographic location may also be used to determine a charge rate, based on various incentive or sponsorship programs of which the user is a member. For example, the user may receive a discount if he/she uses network access from certain locations, such as a certain business, a certain airport club, etc. The known geographic location information may also be used to selectively provide different access or privilege levels based on the geographic location, e.g., a user may have greater privilege/access levels at a first geographic location than from a second different geographic location. This known geographic location information may further be used to provide services to the user which are dependent upon the geographic location of the user. For more information on the use of geographic location information for providing geographic based services, please see U.S. Pat. No. 5,835,061, referenced above.

For example, the owner of a business may install an access point within the business as an incentive for customers. If a subscriber to the service connects to the service within that business, free use of the service, or service at a reduced rate, may be provided during the access. During such an access, the amount of available service indicated by the value bucket may be unchanged or reduced at a lower rate than through other service accesses. In addition, sponsorship and geographic location may both be utilized in the billing model. For example, if the business has an incentive program, and if the user belongs to this incentive program as indicated by the user's digital certificate, the user may receive additional discounts on network access, or may receive "points" in the particular incentive program. As one example, the digital certificate of a user may contain information indicating the user is a member of the American Airlines Advantage program. If this user accesses the service provider's network through an access point located near an American Airlines gate or in an American Airlines Admiral's Club, American Airlines may choose to allow the user free or reduced rate access while connected to the network. The airline may also use this information to send advertisements or incentive information to the subscriber, as well as update "points" or "miles" in the user's AA Advantage account.

In step 212 the network provider may examine the received identification information, e.g., the System ID, or other identification information and determine whether the received identification information is known or recognized. In step 212 the method may also determine if other id information is valid. If the identification information is determined to not be known, e.g., the System ID is unknown, then in step 222 the method may perform processing to account for the unknown identification information. Step 222 may also involve performing processing for an unknown or incorrect digital certificate or other unknown information.

In step 222, where the identification information is determined to not be known or recognized, the method may select a default network provider for the user for network access. The default network provider may be the provider who maintains the wireless network system being used, or may be a randomly selected provider. In step 223 the user may be required to register with this provider to gain network access. This provider may then arrange for ad hoc billing of the user, such as by credit card. For example, the provider may present a web page on the user's PCD 110 requesting the user to enter credit card information for access to the network. Operation then proceeds to step 232.

Also, if the identification information is determined to not be known, the access or privilege level of the user may be set to the lowest possible level. This, for example, may allow the user to only have access to certain limited local resources, but no external access, e.g., to the Internet. Thus, for example, where the APs 120 are located in an airport, the user having a low access level, e.g., the user whose identification information is not known, may be granted access to certain local resources, such as coffee shops, bookstores, and advertising on the local LAN at the airport, but may not be provided with Internet access. Access to local resources may be allowed since this does not require the use of external facilities and hence does not consume off-property bandwidth, and thus is relatively inexpensive to provide. Alternatively, if the identification information of a user is determined to not be known, the system may provide some form of external access, which may be billed separately by an external Internet provider, without the user being able to view or use any local network resources.

If known identification information is determined to be received in step 212, then in step 216 the method may determine the network provider which corresponds to the identification information (e.g., the System ID). In the preferred embodiment, a data structure comprising network provider information is stored in each of the access points 120. In this embodiment, the respective access point with which the user is communicating receives the identification information and uses the identification information to obtain the appropriate or corresponding network provider to which the user of the PCD 110 is subscribed. In step 218 the respective access point 120 may also access the data structure to determine the appropriate access method or access level for providing data or packets to the respective network provider. The respective access point 120 may instead access this information from a separate data structure stored in MIB 150.

In an alternate embodiment, the PCD 110 of the user may provide all of this information to the access point 120. In this embodiment, the data structure containing the network provider data and access information may not be required to be stored in the access points 120 or on the network. Alternatively, data may be stored on the network 130, e.g., in the access points 120 or in the MB 150, which is used only to validate this information received from the user.

As discussed above, the data structure is preferably a table comprising a plurality of three-tuples wherein each tuple stores a set of identification information, the corresponding network provider associated with that identification information, and access information associated with that network provider and/or the user. An example of this data structure is shown in FIG. 5. The data structure shown in FIG. 5 includes five different sets of three-tuples. It is noted that the data structure may take any of various forms.

The access information may include an access method, possibly including a destination address or other method by which data packets are routed to/from the respective site of the network provider or other method which directs that network access be provided by that network provider. The access information may also include an access level or privilege level that indicates which network resources that the user may access, e.g., whether the user is only allowed access to resources on the local network 130, or is only or in addition allowed external access, such as Internet access.

Thus, when the access point 120 receives the identification information, the access point may simply use the identification information to index into a table containing this information to determine the appropriate network provider and the respective access method and/or access level.

It is noted that each of steps 212, 216 and 218, and 222 may be performed as one action or a series of related actions. In other words, when the access point 120 receives the identification information, if the identification information does not index into any of the entries in the data structure or table, then the identification information or System ID is determined to be unknown or not associated with a respective network provider as determined in step 212. In this case, the default provider and default access level may be selected as performed in step 222. If the identification information does index properly into an entry of the table, but the corresponding network provider does not have the necessary equipment to accommodate the user, then this may also be treated as unknown identification information, where another provider or the default provider may be selected as performed in step 222.

If the identification information properly indexes into the table, then in steps 216 and 218 information from the respective entry of the table is accessed and used to determine a corresponding network provider which can accommodate the user's network access, as well as the associated method and access level for providing network access using the network provider.

After the network provider and associated access method/level have been determined in each of steps 216 and 218, then in step 232 network access or network services may be provided to the portable computing device 110 through the determined network provider. For example, in step 232 the access point 120 to which the user is communicating may operate to provide data to/from a destination specified by the determined network provider using the method specified by the determined network provider, e.g., the method comprised in the table or data structure. In one embodiment, the access point 120 may operate simply as a bridge or router which operates to forward or route packets to the appropriate destination, e.g., to the network provider's network device 160 or to the provider's site. As noted above, the network provider may provide a network device 160 such as a router, which operates to route packets to the provider's site or otherwise simply allow Internet access to the user. Thus in step 232 the method allows the personal computing device of the user access to the network using the user's provider.

In another embodiment, the access point 120 itself operates as a router to route packets to the determined network provider's site, which may be located on the Internet. Thus, in this embodiment, the network provider may not be required to provide any type of network device 160 to enable network access for its respective subscribers. Rather, data packets from the PCD 110 of the user may be routed to the network provider's site on the Internet, which may be located in any location.

In step 232 data is communicated between the PCD 110 and the respective destination specified by the network provider preferably using a secured technique. Examples of possible secured techniques include Layer 2 forwarding; various tunneling protocols such as PPTP, IPSEC, GRE, and IP-in-IP; and tagged VLANs (IEEE 802.1q), among others.

In one embodiment, in step 232 the access point 120 operates to direct PCDs 110 to an available communication channel, e.g., an available RF channel or other wireless channel, possibly based on information received from the PCD 110. Thus the access point 120, not the PCD 110, may assign channels for communication. For example, the an access point 120 may operate to direct a PCD 110 to an available communication channel (e.g., an RF channel) based on the identification information, e.g., the SID, received from the PCD 110. The access point 120 may also operate to direct the PCD 110 to an available communication channel based on other types of identification or authentication information, or on the determined access level of the PCD. This allows an access point 120 to separate the communication traffic onto different channels based on the network provider being used, or based on the access or privilege level of the PCD 110. For example, the access point 120 may assign a PCD 110 a communication channel based on whether the PCD 110 has access to private portions of the network.

In step 234 the selected network provider may record charges for the network access. In one embodiment, each of the network provider's respective devices 160 may maintain separate charge/billing information for each of their respective subscribers. Thus, the network device 160 of the selected network provider may record charges for the network access of the user. Alternatively, a computer system coupled to the network 130, such as the MIB 150, or another computer system, may receive information from the wireless access point 120 as to the determined network provider, and the computer system may maintain billing/charging information for each of a subset or all of the network providers. In one embodiment, billing information for the user may be stored on the PCD 110 and may be provided to the AP 120.

As noted above, network charging information may also be based on known geographic information, as well as, for example, sponsorship or demographic information of the user, which may be provided to the access point in a digital certificate.

As noted above, the data structure or table containing network provider information may be stored in each of the access points 120. Alternatively, the data structure may be stored in a separate computer system, such as the MIB 150. In this latter instance, each of the access points 120 may operate to forward the identification information to the MIB or other computer system 150, and this computer system performs steps 212, 216 and 218 of determining the appropriate network provider and corresponding access method, or selecting the default provider. Once the network provider and access method have been determined in this embodiment, this information may be forwarded to the respective access point 120 for proper routing, or the respective access point 120 may forward data received from the PCD 110 of the user to the MIB 150 or an associated router for proper routing to the respective network provider's device 160 or to the appropriate site on the Internet.

Thus, in step 232 the PCD 110 of the user is allowed to obtain network access through his previously chosen network provider, i.e., through the network provider to which the user has previously subscribed. As noted above, the network provider, may operate to maintain billing/charging information through its equipment 160, at its site, or through a shared resource such as MIB 150. As also noted above, the billing information may be stored on the PCD 110 of the user, e.g., in the user's digital certificate. In this case, if the AP 120 answers the query of the PCD 110 and allows access after confirming the identification information, the system allow for roaming and billing. This effectively allows users to roam on various network infrastructures, e.g., allows a user who is a subscriber of network provider A to roam on a network infrastructure operated and maintained by network provider B. Alternatively, certain portions of the network infrastructure may be built and maintained by a third party who is not a network provider, and subscribers of each of the various network providers may be able to roam onto this network, perhaps with a small fee being paid to the manager of the network infrastructure in addition to the fee normally paid to the network provider for network access. Further, users who have never previously subscribed to a network provider may be allowed to communicate with an AP 120 and select a network provider, or be assigned the default network provider, for access.

Different Access Levels

As noted above, in one embodiment, the data structure or table may store one or more different access methods depending upon an access level received within the identification information. Thus, referring back to FIG. 1, the network 130 may provide certain local network resources as well as external Internet access which may be both available to users having a first access level. Users with a second lower access level may not be entitled to external access, but may be simply able to view or utilize certain local network resources on network 130. Users may also be selectively allowed to make 802.11 voice calls using the network, depending on access level.

For example, in an airport scenario, a non-recognized user, or a user paying a lower fee, may have an access/privilege level that only allows him/her local content such as various airport advertising, airport information such as the layout of the airport, including where the restroom, restaurants, etc. are located, flight information, etc., but does not allow the non-recognized user external access, e.g., access to the Internet. A non-recognized user would of course also not have any access to private corporate LAN's maintained on this network, such as the corporate LANs of airlines located at the airport.

If the wireless network system provides a mechanism for the user to register or subscribe to a network provider, then the user may do so and receive Internet access through that selected provider. As another alternative, the network system may provide a mechanism for the user to register or subscribe to an external network provider, e.g., and external ISP, perhaps with a small referral fee paid to the maintainer of the network system.

Alternatively, the network 130 may provide various local resources as well as external Internet access which are both available to users having a first access level, and users with a second access level may not be entitled to view or utilize these local network resources on network 130, but may be simply provided some form of external access, such as external telephone access using VoIP or possibly a pathway to the Internet.

For example, where the network 130 and one or more wireless access points 120 are comprised in an airport, one or more airlines may maintain various computing resources on the local network 130 which are usable solely by airline employees and personnel. In this embodiment, PCDs 110 of airline employees may comprise identification information which indicates an access level that allows them access to the various computing resources on the network 130. Thus, employees of a first airline such as American Airlines may have first access level information stored on their PCD 110 that entitles them to utilize certain American Airline computing resources on the network 130, whereas employees of Delta Airlines may have second different access level information stored on their PCD 110 which enables use of only Delta Airlines computing resources located on the network 130 etc. For those users who are not airline employees or personnel, these users may have access information stored on their PCD 110 which only allows them external access toward the Internet and use of certain non-private local resources, but does not allow them to view or use any of the private computing resources on the network 130. Thus, PCDs 110 of users may store various access level information comprised within the identification information which selectively allows access to certain resources on the local network 130. This effectively allows private and public portions of the network 130.

As another example, consider an office, such as a law firm office or business which maintains one or more wireless or wired access points 120. Employees of the office may have first access level information (possibly of varying degrees) stored on their PCD 110 which enables them access to selected resources or all resources on this network 130. However, visitors to this office which do not have this privilege or access level may be detected by a wireless or wired access point and not be allowed to view or use any of the resources on the local network 130, but rather may simply be provided a port for complementary (or billable) external access to the Internet. Thus, a visitor or customer of the business who is physically present in the office and desires Internet access may utilize his PCD 110 to gain access to the Internet through the local network of the office 130, without the visitor or customer being able to view any of the computing resources, file servers, etc. of that local network 130. In addition, if the user's corporate intranet is web-based, the user may be allowed access to his own LAN computing resources remotely. This allows businesses to provide customers and visitors with Internet access through its network 130 without compromising the security of the network 130.

As noted above, in one embodiment, the known geographic location information may also be used to selectively provide different access or privilege levels based on the geographic location, e.g., a user may have greater privilege/access levels at a first geographic location than from a second different geographic location. For example, where the network 130 and one or more wireless access points 120 are comprised in an airport, a user may have a greater access level and hence access to more network resources from, for example, an airline club such as an Admiral's club, and the same user may have a lesser access level and hence access to fewer network resources from an airline gate. Thus the access level of a user may be based at least partly on the geographic location of the user. This may possibly based on various agreements negotiated by service providers to "reward" users who are present at their geographic location, in a similar manner to which the network charge rate may also be based on the geographic location of the user.

Thus, in step 218, where the method determines an access method for the network provider, the method may also determine one or more access levels or privilege levels contained within the identification information to determine whether the should be provided with Internet access or should only have access to local resources on the network. The method may also determine the known geographic location of the user to aid in determining the access level as described above.

In step 232 the access point 120 or MIB 150 or other device operates to provide or route data depending upon this access level. Thus, users with the appropriate access level may have Internet access as well as be able to view and use resources on the network 130, while users lacking this necessary access level may simply be provided with certain local network resources and not have any Internet access. Alternatively, users having a lower access or privilege level may be provided some form of external access, such as local telephone access using VoIP, 802.11 voice calls, or possibly complementary Internet access, without being able to view or use certain private network resources.

FIG. 6 illustrates one exemplary embodiment, where a PCD 110A of a first user comprises identification information having an access level which indicates that the user has access only to the computing resources on the local network 130. In this instance, once this access level has been verified as determined by a lookup in the table or data structure, data or packets from the PCD 110A may be routed to various computing resources on the local network as shown by the arrows designated "1". In contrast, PCD 110B of a second user comprises identification information which includes a greater access level which encompasses accessing local resources on network 130 as well as Internet access. In this instance, in addition to local network access, data or packets may also be routed from the PCD 110B through the access point 120 and directly out to an external access port for Internet access. Thus, the user who does not have the appropriate access or privilege level is able to view or use any computing resources on the network 130, but cannot gain Internet access through the network 130. As noted above, the system can also be configured whereby the user who does not have the appropriate access or privilege level is only allowed Internet access, and users with higher privilege levels are able to view or use computing resources on the network 130.

Thus, the present invention enables two or more network providers to utilize a common set of wireless or wired access points to provide their respective services to a potentially overlapping set of customers. This allows use of a single network infrastructure, which minimally impacts the wireless spectrum available at a location while allowing the maximum possible number of network providers to offer their network access services. In addition, the system and method described herein allows subscribers of a network provider A to be able to use the network access service provided by network provider B in a location otherwise not serviced by provider A without necessarily providing any relationship with provider B and vice versa. This allows a confederation of network providers to offer network access to a larger footprint of locations, which offers more value to each of their respective subscribers.

The system may thus allow network access from multiple different providers. For example, one communication service may be referred to as a Wayport network (Wayport is a Registered Trademark of Wayport, Inc. of Austin, Tex.). A Wayport network may be compatible with other types of similar networks maintained by other companies. For example, if Wayport networks are installed in the Austin-Bergstrom International airport and similar 'XYZ' networks are installed in a hotel in downtown Austin, a user that has subscribed to Wayport networks may be able to use the services offered at the downtown hotel by XYZ. More specifically, a user that has registered with a Wayport network (e.g., has entered demographic data and agreed to pay transaction costs) may not need to register with XYZ. The user may use other network providers (e.g., XYZ networks) and still only be billed from one company (e.g., the provider of the Wayport network with which the user is registered). This may be accomplished through agreements established between different network providers.

For example, a Wayport network-registered user attempts to connect to a XYZ network in the downtown hotel. In the embodiment described herein, the access point 120 maintained by the XYZ network still answers or communicates with the PCD 110, even though the PCD 110 provides identification information that is different from, and possibly not even recognized by, the access point 120. In this example, assume the XYZ network notices from the PCD ID information that the user is not registered on the XYZ network, but is registered on the WAYPORT network. The XYZ network may perform a verification of the PCD ID by querying a database of registered PCD IDs on the WAYPORT network. The XYZ network may acquire demographic information on the credentials of the user. If the credentials of a user are not acceptable, access to the XYZ network may be denied. If the credentials are acceptable, the XYZ network may grant the user access to various goods, information and/or service providers. The XYZ network may inform the user (via a message on the user's PCD) that there is an additional cost for accessing the XYZ network as a non-registered user. The user may then have the choice of paying the additional fees for the services or disconnecting. In addition, the user may have the option of registering with the XYZ network to avoid paying 'roaming' fees.

Wireless AP Usage of Multiple Channels

A wireless access point 120 can use one of a plurality of different RF (radio frequency) channels for communication with portable computing devices of users. For example, a wireless access point 120 can use one of RF channels 1 through 11. As is well known, RF channels 1, 6 and 11 are non-overlapping, with the remainder of these channels being partially overlapping with other channels.

According to one embodiment of the present invention, each wireless access point can communicate on one or more, e.g. a plurality of or all of, the available wireless channels, e.g., the available RF channels. Furthermore, each access point 120 can control which channel the portable computing device 110 of a client is able to use. In one embodiment, each portable computing device may scan each of the RF channels until it detects a wireless access point 120 at one of the channels.

In one embodiment, one or more of the wireless access points may each utilize a plurality of the RF channels, e.g., may use each of the non-overlapping channels 1, 6 and 11 to effectively provide up to three times the channel capacity. Thus, the wireless access point 120 may be able to control allocations of a plurality or all of the respective RF channels to selectively obtain higher bandwidth when appropriate, or to simply accommodate a greater number of subscribers. Thus, if a wireless access point using only one RF channel could only handle fifty PCD's 110 on that respective channel, the wireless access point may operate to use all three non-overlapping RF channels to effectively triple this capacity to a total of 150 simultaneous PCD's 110.

As another example, if the wireless access point 120 is only communicating with one portable computing device 110, then the wireless access point 120 may optionally or selectively use each of the three non-overlapping RF channels to produce effectively three times the bandwidth for this communication. As additional portable computer devices come into communication with the respective wireless access point, 120, the wireless access point 120 may selectively allocate different channels to different ones of these PCD's as needed. Further, if more than three PCD's are communicating with the respective wireless access point, the wireless access point 120 may partition one or more of the respective channels for the respective users, such as using wireless Ethernet Collision Sense Multiple Access/Collision Detection (CSMA/CD) or other multiple access schemes such as TDMA, FDMA, or CDMA, among others.

In one embodiment, as described above with respect to step 232, the access point 120 operates to direct PCDs 110 to an available channel, possibly based on information received from the PCD 110. Thus the access point 120, not the PCD 110, may assign channels for communication. For example, the an access point 120 may operate to direct a PCD 110 to an available communication channel (e.g., an RF channel) based on the identification information, e.g., the SID, received from the PCD 110. The access point 120 may also operate to direct the PCD 110 to an available communication channel based on other types of identification or authentication information, or on the determined access level of the PCD. This allows an access point 120 to separate the communication traffic onto different channels based on the network provider being used, or based on the access or privilege level of the PCD 110. For example, the access point 120 may assign a PCD 110 a communication channel based on whether the PCD 110 has access to private portions of the network.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
   providing, at a wireless access point, an end-user computing device with access to a network, wherein a cost for providing the access to the network is reduced based on an account associated with an incentive program, and wherein the account is associated with a user of the end-user computing device; and
   transmitting, from the wireless access point, data to the end-user computing device to present a visual display at the end-user computing device, wherein the visual display includes an advertisement provided by a particular entity.

2. A method comprising:
   receiving, at a wireless access point, information from an end-user computing device to obtain access to a network;
   providing, at the wireless access point, the end-user computing device with access to the network, wherein a cost for providing the access to the network is reduced based at least in part on an account associated with an incentive program, and wherein the account is associated with a user of the end-user computing device; and
   transmitting, from the wireless access point, data to the end-user computing device to present a visual display at the end-user computing device, wherein the visual display includes one or more advertisements provided by a particular entity.

3. The method of claim 2, wherein the particular entity is distinct from a provider of the wireless access point.

4. The method of claim 2, wherein a reduction of the cost is determined by the particular entity.

5. The method of claim 2, further comprising determining a privilege level of the access to the network provided to the end-user computing device based on a geographic location associated with the end-user computing device.

6. The method of claim 2, wherein the one or more advertisements are determined based on the incentive program associated with the account.

7. The method of claim 2, wherein the information indicates the user of the end-user computing device is associated with the account.

8. The method of claim 2, wherein the incentive program is associated with a business.

9. The method of claim 8, wherein the business provides rewards points to the account.

10. A system comprising:
    a processor; and
    a memory accessible to the processor, the memory storing instructions that, when executed by the processor, cause the processor to perform operations comprising:
       determining, at a wireless access point, a privilege level of access to a network provided to an end-user computing device based on a geographic location associated with the end-user computing device;
       providing, at the wireless access point, the end-user computing device with access to the network; and
       transmitting, from the wireless access point, data to the end-user computing device to present a visual display at the end-user computing device, wherein the visual display includes an advertisement provided by a particular entity.

11. A system comprising:
    a processor; and
    a memory accessible to the processor, the memory storing instructions that, when executed by the processor, cause the processor to perform operations comprising:
       receiving, at a wireless access point, information from an end-user computing device to obtain access to a network;
       determining a privilege level of the access to the network provided to the end-user computing device based on a geographic location associated with the end-user computing device;
       providing, at the wireless access point, the end-user computing device with access to the network; and transmitting, from the wireless access point, data to the end-user computing device to present a visual display at the end-user computing device, wherein the visual display includes one or more advertisements provided by a particular entity.

12. The system of claim 11, wherein the particular entity is distinct from a provider of the wireless access point.

13. The system of claim 11, wherein a cost for providing the access to the network is reduced based at least in part on an account associated with an incentive program, and wherein the account is associated with a user of the end-user computing device.

14. The system of claim 13, wherein the information indicates the user of the end-user computing device is associated with the account.

15. The system of claim 13, wherein the incentive program is associated with a business.

16. The system of claim 15, wherein the business provides rewards points to the account.

17. The system of claim 13, wherein a reduction of the cost is determined by a particular entity.

18. The system of claim 13, wherein the advertisements are determined based on the incentive program associated with the account.

19. A non-transitory computer readable storage device storing instructions that, when executed by a processor, cause the processor to perform operations comprising:
   receiving, at a wireless access point, information from an end-user computing device to obtain access to a network;
   providing, at the wireless access point, the end-user computing device with access to the network, wherein a cost for providing the access to the network is reduced based at least in part on an account associated with an incentive program, and wherein the account is associated with a user of the end-user computing device; and
   transmitting, from the wireless access point, data to the end-user computing device to present a visual display at the end-user computing device, wherein the visual display includes one or more advertisements provided by a particular entity.

20. The non-transitory computer readable storage device of claim 19, wherein the operations further comprise determining a privilege level of the access to the network provided to the end-user computing device based on a geographic location associated with the end-user computing device.

* * * * *